(12) United States Patent
Gangjee et al.

(10) Patent No.: US 12,260,774 B2
(45) Date of Patent: Mar. 25, 2025

(54) GENERATIVE CONTENT FOR COMMUNICATION ASSISTANCE

(71) Applicant: Synchron Australia Pty Limited, Dover, DE (US)

(72) Inventors: Javed Gangjee, London (CA); James Bennett, Elwood (AU); Thomas James Oxley, Dover, DE (US)

(73) Assignee: Synchron Australia Pty Limited, Dover, DE (US)

( * ) Notice: Subject to any disclaimer, the term of this patent is extended or adjusted under 35 U.S.C. 154(b) by 0 days.

(21) Appl. No.: 18/734,476

(22) Filed: Jun. 5, 2024

(65) Prior Publication Data

US 2024/0404428 A1    Dec. 5, 2024

Related U.S. Application Data

(60) Provisional application No. 63/506,154, filed on Jun. 5, 2023.

(51) Int. Cl.

| | | |
|---|---|---|
| *G06F 40/35* | (2020.01) | |
| *G06F 40/40* | (2020.01) | |
| *G09B 21/00* | (2006.01) | |
| *G06F 3/0482* | (2013.01) | |
| *G10L 13/02* | (2013.01) | |

(52) U.S. Cl.
CPC ............. *G09B 21/00* (2013.01); *G06F 40/35* (2020.01); *G06F 40/40* (2020.01); *G06F 3/0482* (2013.01); *G10L 13/02* (2013.01)

(58) Field of Classification Search
CPC ........ G06F 40/35; G06F 40/10; G06F 40/106; G06F 40/149; G06F 40/151; G06F 40/183; G06F 40/20; G06F 40/205; G06F 40/274; G06F 40/30; G06F 40/45; G06F 40/47; G06F 40/56; G10L 15/22; G10L 15/06; G10L 15/063; G10L 15/08; G10L 15/18; G10L 15/1815; G10L 15/1822; G10L 15/20; G10L 15/24; G10L 15/25; G10L 15/26
USPC ... 704/270.1, 1, 2, 5, 9, 235, 250, 255, 257, 704/272

See application file for complete search history.

(56) References Cited

U.S. PATENT DOCUMENTS

| | | |
|---|---|---|
| 2013/0152000 A1 | 6/2013 | Liu et al. |
| 2015/0100537 A1 | 4/2015 | Grieves et al. |
| 2016/0241500 A1 | 8/2016 | Bostick et al. |
| 2018/0061400 A1 | 3/2018 | Carbune et al. |
| 2019/0340527 A1 | 11/2019 | Liden et al. |
| 2020/0296480 A1* | 9/2020 | Chappell, III ......... H04H 60/33 |
| 2022/0223064 A1* | 7/2022 | Chauhan ............... G06F 3/0482 |
| 2023/0274481 A1* | 8/2023 | Gustman ............. H04N 21/251 |
| | | 715/202 |

FOREIGN PATENT DOCUMENTS

WO    WO 2024/254153    12/2024

* cited by examiner

*Primary Examiner* — Qi Han
(74) *Attorney, Agent, or Firm* — Levine Bagade Han LLP

(57) ABSTRACT

Methods and systems for using generative content to improve the ability of an individual to communicate using electronic-assisted communication.

21 Claims, 13 Drawing Sheets

GENERATIVE CONTENT FOR COMMUNICATION ASSISTANCE

CROSS-REFERENCE TO RELATED APPLICATIONS

This application is a non-provisional of U.S. Provisional Application 63/506,154, filed Jun. 5, 2023, the entirety of which is incorporated by reference. International Patent Application No. PCT/US2024/032558 filed Jun. 5, 2024 is also incorporated by reference.

FIELD OF THE INVENTION

Methods and systems for using generative content to improve the ability of an individual to communicate using electronic-assisted communication.

BACKGROUND OF THE INVENTION

The availability of brain-computer interfaces (BCIs) allows users to provide instructions to the BCI using an endogenous, exogenous signal, or a combination of signals. The use of such BCIs can improve the ability of the individual to regain lost independence, including the ability to interact with his or her environment with increased autonomy. Typically, an endogenous signal is a signal that the individual generates internally. Such endogenous signals can include neural signals detected by sensors that measure electrical impulses produced when the individual generates a thought, moves a muscle (either through actual movement or imagined movement in the case of a paralyzed individual), etc. Exogenous signals can include any signal where the individual takes an action that is measured or generated externally external to the individual. For example, exogenous signals can include a signal generated when the individual triggers an external mechanism or electronic device (e.g., a mouse click, screen contact/tap, keyboard click, voice command, etc.), a signal received by an inertial sensor that uses inertia to detect physical movement of a body part of the individual. A signal is received using a camera-type device that detects movement of a body part of an individual (e.g., an eye movement detector, a body movement detector, etc.), sip and puff controls (typically used for wheelchairs), etc.

People with full or partial paralysis, disabilities, or other muscular disorders tend to be limited in the amount of information they can communicate per unit of time. While assistive technologies, such as eye trackers and BCIs, can facilitate communication, the speed of communication is typically slow with conventional systems. For example, if an impaired individual attempts to spell out a sentence, they would typically do this by spelling out each character in the sentence at a slow speed, which can be a painstaking process if they only have access to a limited number of inputs that can be generated to interact with the BCI.

Many conventional BCI systems are limited because the generation of a signal is usually limited to a few commands or a single command to control the BCI system, which can also require significant effort on the part of the user. Therefore, conventional BCI systems often require a user to significantly interact with the BCI system for communicating with others. Such increased interaction can cause user fatigue, ultimately limiting the autonomy of the user. There remains a need to increase the ability of a BCI user to communicate using the BCI system in a manner that reduces effort by the user while increasing a personalization of the system for the user.

SUMMARY OF THE INVENTION

The present disclosure includes a number of systems and methods for assisting an individual in using electronic-assisted communication. Such assistance can increase speed of communication, reduce user fatigue, and/or provide personalization so that the electronic-assisted communication is a closer representation of the user as compared to traditional electronic voice generators.

Variations of the present disclosure include a method for assisting an individual in engaging in electronic-assisted communication, where one variation of a method includes obtaining an input prompt (or input communication/message) using an electronic assistance device; assessing the input prompt to identify a topic category associated with the input prompt using a computer processor; generating a plurality of content responses using the topic category such that the plurality of content responses are conversationally associated/responsive with the topic category, where each content response from the plurality of content responses is further associated with an emotion identifier selected from a plurality of emotion identifiers; electronically displaying the plurality of content responses in a display of a user interface, where a first emotion identifier associated with a first content response is visually distinguishable on the display from a second emotion identifier associated with a second content response; wherein the user interface is configured to permit the individual to select at least one of the plurality of content responses as a selected content response; and electronically communicating the selected content response using the electronic assistance device. In an alternate variation, the method step described above does not require assessing the input prompt to identify a topic category associated with the input prompt. In such a case, generation of the plurality of content responses occurs such that the plurality of content responses are conversationally associated/responsive to the input prompt.

Variations of the present disclosure the electronic assistance device being a brain-computer interface, a portable digital device (electronic tablets, smart-phones, personal devices, smart watches, virtual reality headsets/eyewear, etc., and/or a computer).

Generating the plurality of content responses can include using a large language model operatively networked to the electronic assistance device. Operatively networked can include accessing via electronic storage, a local area network, a virtual network, cloud-based networks, or any network used for electronic communications.

Variations of the present disclosure can include accessing a database containing a plurality of informational data specific to the individual, where generating the plurality of content responses includes generating at least one content response containing at least one informational data specific to the individual.

The plurality of informational data specific to the individual includes data selected from the group consisting of demographic information, personal preferences, biographic information, family information, health information, calendar information, medical treatment information, historical information.

Variations of the present disclosure obtaining the input prompt actively by entering a recording into the electronic assistance device.

Variations of the present disclosure include a method where obtaining the input prompt occurs passively, such as a microphone detecting conversation and the system identifying part of the conversation as an input prompt.

Variations of the present disclosure include a method, wherein electronically communicating the selected content response using the electronic assistance device includes displaying the selected content response electronically.

The present disclosure also includes electronically communicating the selected content response using the electronic assistance device. This can include generating an audible voice that recites the selected content. In some cases, before electronically communicating the selected content, the individual has an ability to customize the selected content response using the user interface.

In another variation, the methods for assisting an individual in engaging in electronic-assisted communication include obtaining an input prompt/communication using an electronic assistance device, generating a plurality of emotion identifiers using the input prompt; electronically displaying the plurality of emotion identifiers in a display of a user interface, wherein the user interface is configured to permit the individual to select at least one of the plurality of emotion identifiers as a selected emotion identifier; and electronically displaying a selected content response associated with the selected emotion identifier on the user interface; and electronically communicating the selected content response using the electronic assistance device. Variations of the methods include initially displaying plurality of emotion identifiers without any text of the content response. Additional variations include displaying a single visual identifier (e.g., emoticon, text, color, shading, etc.) associated with each emotion identifier. As noted above, the methods are not limited to displaying emotion identifiers. Any identifier category can be displayed.

In another variation, electronically displaying the selected content response associated with the selected emotion identifier on the user interface comprises generating a plurality of content responses associated with the selected emotion identifier and displaying the plurality of content responses on the user interface, where the user interface is configured to permit the user to select the selected content response from the plurality of content responses.

In an additional variation, assessing the input prompt to identify a topic category associated with the input prompt includes using a computer processor such that the plurality of content responses are conversationally associated with the topic category, where each content response from the plurality of content responses is further associated with the selected emotion identifier.

Variations of the methods include electronically displaying the plurality of emotion identifiers in the display of the user interface such that each of the plurality of emotion identifiers are visually distinguishable from a remainder of the plurality of emotion identifiers.

Variations of the present disclosure include an electronic system for assisting an individual in engaging in electronic-assisted communication, the electronic system including: a memory unit; a recording device configured to convey an input prompt to the memory unit; a processor configured access the memory unit to assess the input prompt and identify a topic category associated with the input prompt and generate a plurality of content responses using the topic category such that the plurality of content responses are conversationally associated with the topic category, where each content response from the plurality of content responses is further associated with an emotion identifier selected from a plurality of emotion identifiers; a user interface having an electronic display configured to display the plurality of content responses, where the processor is further configured to provide to the electronic display a first emotion identifier associated with a first content response that is visually distinguishable on the electronic display from a second emotion identifier associated with a second content response; the user interface further configured to permit the individual to select/electronically select at least one of the plurality of content responses as a selected content response; and where the processor is further configured to electronically communicate the selected content response.

In some variations of the present disclosure include an electronic system, wherein the processor is operatively networked to a large language model for generating the plurality of content responses.

Variations of the present disclosure include an electronic system, wherein the processor is operatively networked to a database containing a plurality of informational data specific to the individual, where generating the plurality of content responses includes generating at least one content response containing at least one informational data specific to the individual.

Variations of the present disclosure include an electronic system, where the recording device is configured to actively have a recording state for actively recording the input prompt.

Variations of the present disclosure include an electronic system, where the recording device is configured to actively a recording state that passively records the input prompt.

Variations of the present disclosure include an electronic system where the processor is configured to electronically communicate the selected content response by causing the selected content response to be transmitted to an external display device.

Variations of the present disclosure include an electronic system where the processor is configured to electronically communicate the selected content response by displaying the selected content response on the electronic display.

Variations of the present disclosure include an electronic system, further including a speaker such that the processor causes the generation of an audible voice of the selected content.

Variations of the present disclosure include a method for assisting an individual in engaging in electronic-assisted communication, the method including: prompting the individual to enter an input at an input prompt in an electronic assistance device; accessing a database containing personal information data about the individual; generating at least one content phrase using the personal information data; electronically displaying at least one content phrase in a display.

Variations of the present disclosure include a method, where electronically displaying at least one content phrase in the display of the user interface requires an action by the individual.

Variations of the present disclosure include a method, where electronically displaying at least one content phrase in the display of the user interface occurs when the individual starts to enter the input.

Variations of the present disclosure include a method, wherein electronically communicating the selected content response using the electronic assistance device includes displaying the selected content response electronically.

Variations of the present disclosure include a method, wherein electronically communicating the selected content response using the electronic assistance device includes generating an audible voice that recites the selected content.

Variations of the present disclosure include a method, wherein before electronically communicating the selected content, providing the individual with an ability to customize the selected content response using the user interface.

Variations of the present disclosure include an electronic system for assisting an individual to engage in electronic-assisted communication, the system including: a processor unit coupled to a memory unit; a program module operatively networked with an image generator, wherein the program module is configured to receive a communication command prompt and generate a custom pictogram tile having a unique image that is associated with the communication command prompt, the program module being configured to store the communication command prompt and the custom pictogram tile in the memory unit; and a user interface configured to permit the individual to visually observe a plurality of custom pictogram tiles, the user interface further configured to permit the individual to select at least of the plurality of custom pictogram tiles as a selected pictogram tile to electronically communicate the communication command prompt associated with the selected pictogram tile.

Variations of the present disclosure include an electronic system, wherein the program module is operatively networked with a database containing personal information data about the individual and generates the custom pictogram tile the database.

Variations of the present disclosure include a method for assisting an individual to engage in electronic-assisted communication, the method including: receiving a communication command prompt; generating a custom pictogram tile having a unique image that is associated with the communication command prompt; and a user interface configured to permit the individual to visually observe a plurality of custom pictogram tiles, the user interface further configured to permit the individual to select at least of the plurality of custom pictogram tiles as a selected pictogram tile to electronically communicate the communication command prompt associated with the selected pictogram tile.

Variations of the present disclosure include a method, wherein generating the custom pictogram tile includes using information from a database containing personal information data about the individual.

DETAILED DESCRIPTION

The following relates to the use of generative content to improve electronic communication assistance to individuals suffering from full or partial paralysis, disabilities, or other muscular disorders that impair conventional verbal communication.

Generative artificial intelligence (AI), specifically language models (LLMs), continue to improve in their capabilities. These models demonstrate a strong understanding of language in context, structure, and semantics.

The systems and methods described herein harness the use of an LLM to generate faster communication and typing than would otherwise be the case for people that use electronic-assisted communication devices or systems. While the examples discussed herein include users of BCI systems, the generative content can be applied to any electronic assistance device such as a portable digital device (e.g., electronic tablets, smartphones, etc.) as well as computers or other similar electronic human interface devices that would support an individual using electronic-assisted communication. Electronic assistance device 100 can comprise a brain-computer interface, a portable digital device (electronic tablets, smart-phones, personal devices, smart watches, virtual reality headsets/eyewear, etc., and/or a computer).

Figure 1A:
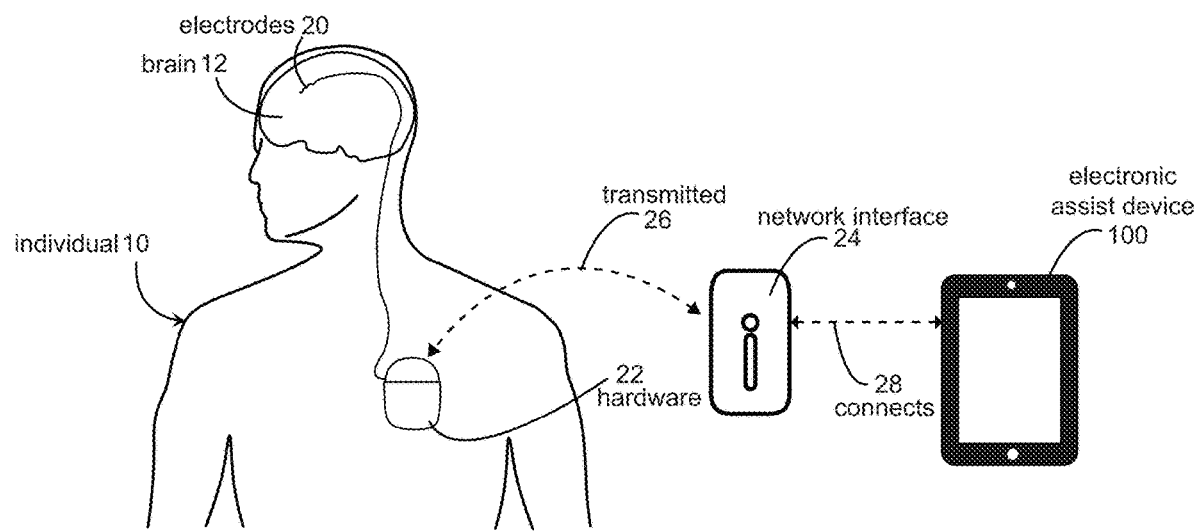
FIG. 1A illustrates an individual accessing a user interface through a BCI.
Figure 1B:
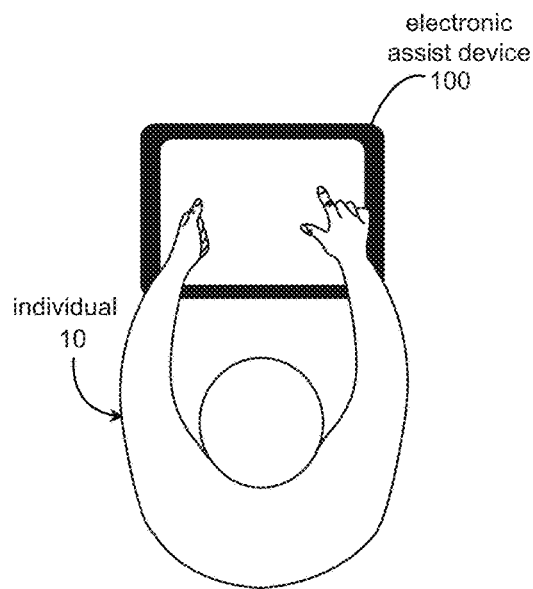
FIG. 1B shows an individual directly accessing a user interface.

FIG. 1A illustrates an example of an individual 10 using a BCI system that includes one or more electrodes 20 that detect neural signals from the individual 10 (e.g., from a brain 12 of the individual 10) that are transmitted 26 by one or more components 22, 24 (e.g., hardware 22 and/or network interface 24) to ultimately connect 28 with an electronic assist device 100 having a user interface. While FIG. 1B illustrates the electrode 20 implanted within the individual 10. The generative content concepts can be applied to any type of BCI, including surgically implanted electrodes positioned exterior to the body, etc. In addition, as shown in FIG. 1B, the concepts disclosed herein can be accessed directly on a user interface by an individual 10 either in combination with a BCI or apart from a BCI.

Figure 2:
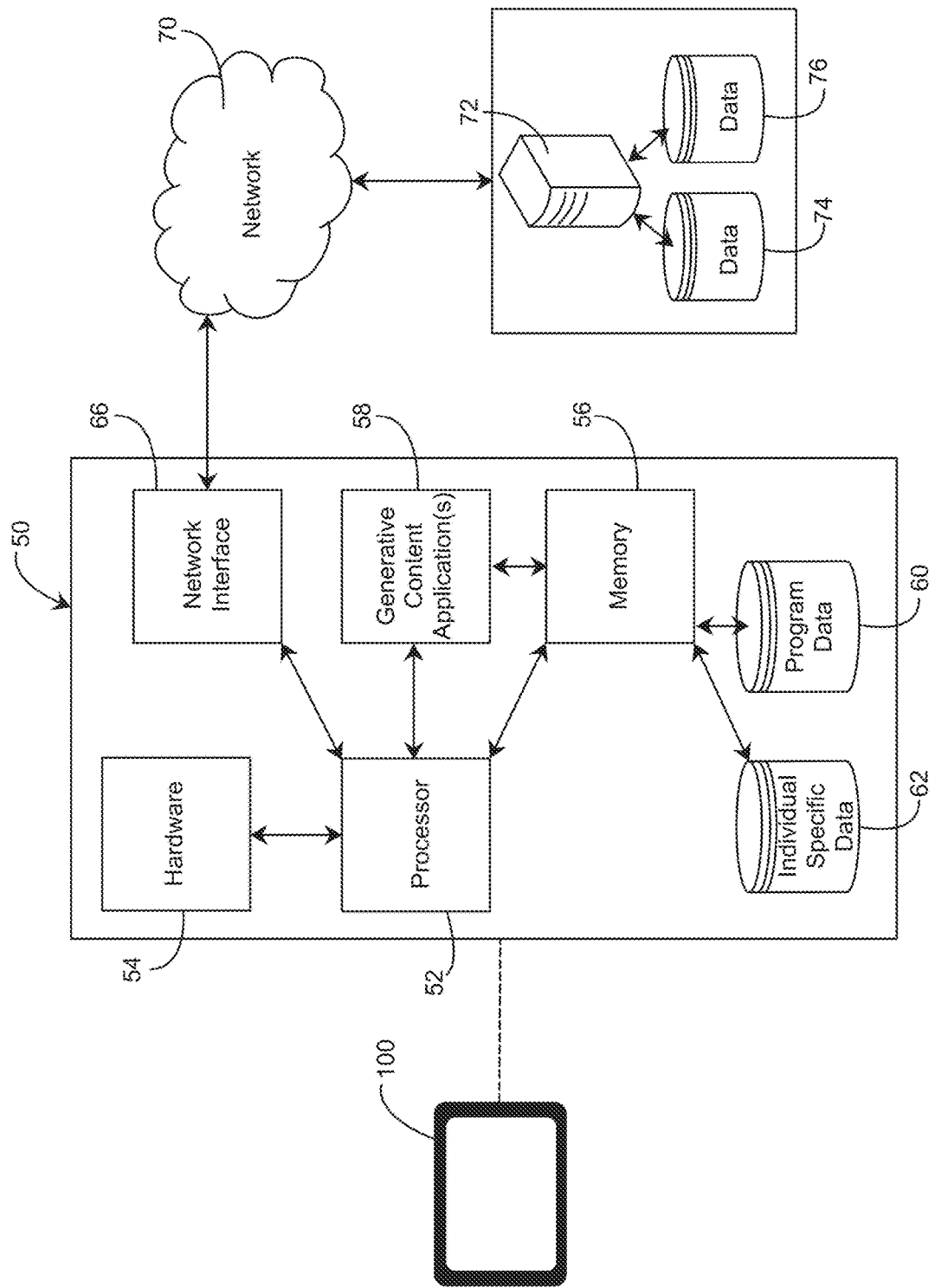
FIG. 2 is a representation of an example schematic of an electronic assistance device employing the generative content.

FIG. 2 is an example representation of schematics 50 of an electronic assistance device 100 employing the generative content methods and systems described herein. The electronic assistance device 100 can function as a communication device or as a control device that interacts with alternate electronic devices. For example, the user can cause the electronic assistance device 100 to generate the communication as an audible voice message. Alternatively, or in combination, the electronic assistance device 100 can couple to another electronic device (e.g., those devices described above) and deliver the communication electronically either by text or an audible voice message.

FIG. 2 shows the example system 50 as having a processor 52, hardware 54, memory 56, and an optional network interface 70. The hardware 54 can include microphones, speakers, display units, and other items that are common to electronic human interface devices or electronic assistance devices, as described above. The system can include one or more generative content applications 58 that generate messages responsive to an input, as described below. The system can also optionally include databases 60 62 that are stored locally on the system. Alternatively, or in combination, the system can rely on a network connection 70 to access remote servers 72 to access additional databases 74, 76.

Figure 3A:
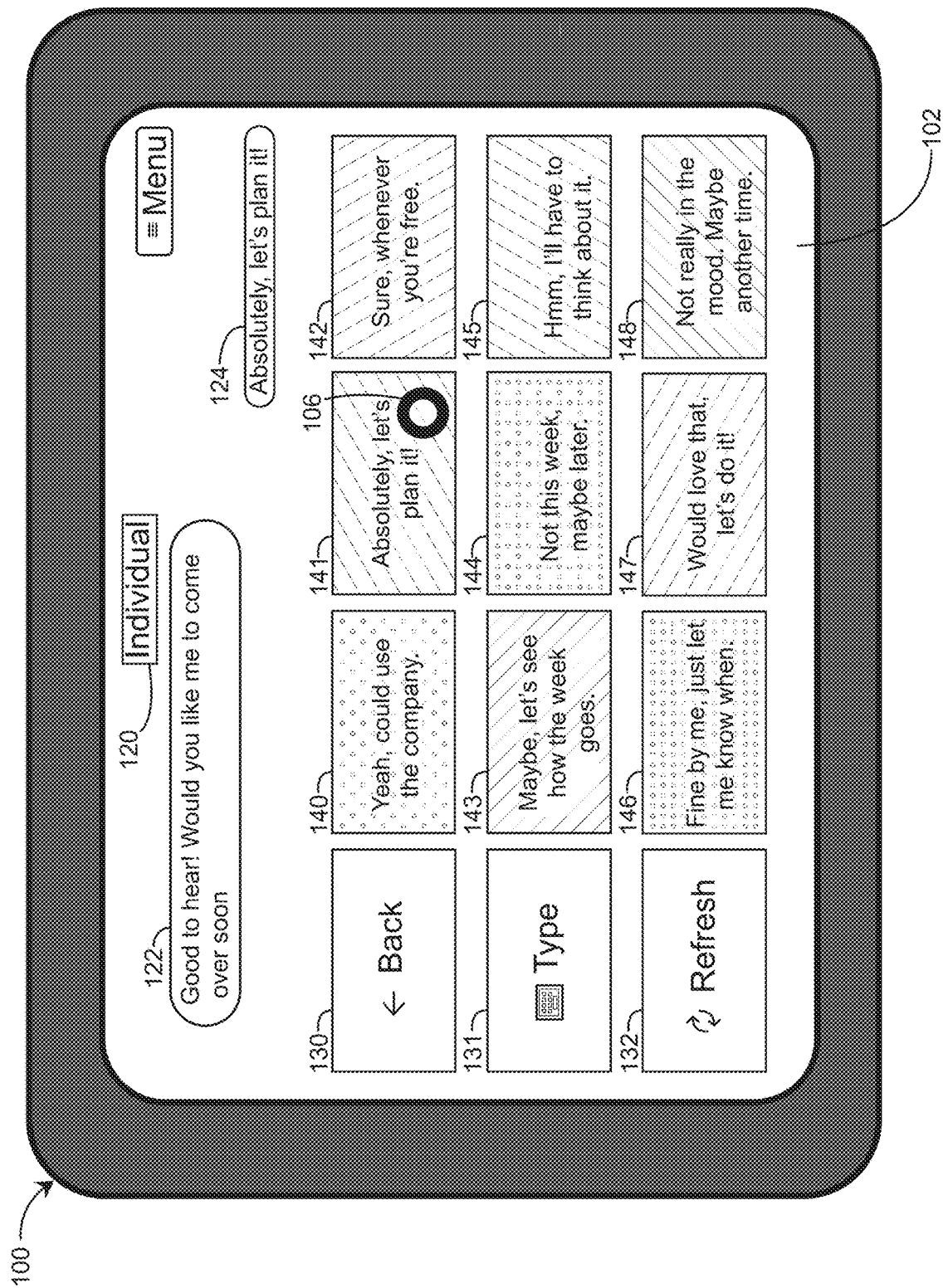
FIG. 3A shows an example of a user interface that assists an individual to engage in electronic-assisted communication.

FIG. 3A shows one example of a user interface 102 on an electronic device 100 that assists an individual to engage in electronic-assisted communication. As shown, the display can include identifier data 120. As noted above, the methods and systems of the present disclosure are intended to assist the individual user in engaging in conversation that mimics conversation that would be natural to the user. Therefore, it is desirable to optionally display the identifier data 120 to confirm that the user's session is occurring using data or other preferences associated with that user.

The user interface 102 can also display an input prompt 122 containing a message that is used to direct the generation of conversational responses. The input prompt 122 can be a message that is received by the individual, a conversational topic entered by the individual, or a topic generated by the system in anticipation of the user's needs given the time, day, location, need for medication, etc. In some variations, the input prompt message can be obtained when the system records a verbal communication (e.g., via a microphone) to capture a message as the input prompt from the user or other individual(s). Alternatively, the system can include an active state that constantly records audio in order to recognize phrases or words as input prompt messages. While FIG. 3A shows the input prompt 122 as being displayed on the user interface 102. Alternative variations do not require such the input prompt 122 to be visually displayed.

Once the message is received as the input prompt, the user interface 102 displays any number of content responses 140-148 generated by the system. The content response is the message to be communicated that is located in the respective tile 140-148. While the illustration shows 9 tiles, the system can show more or less tiles as needed. Further discussion of the generation of the content responses follows below. In this variation, the user interface 102 shows the content responses 140-148, as well as other operational responses 130-132 in a grid arrangement of tiles. As described below, the substance of the content responses 140-148 will be conversationally related to the input prompt message 122. Meaning that the content responses 140-148 will present a range of options for the individual to provide a response that is associated/related to a topic of the input message. It is noted that additional variations of the method and systems described herein do not require a grid arrangement configuration. However, variations of the grid arrangement can be an efficient mode of presenting the information to the user.

As described below, the systems/methods not only generate the content responses 140-148 as conversationally related to a topic of the input message but also categorize the tone of the generated content responses and assign identifiers to each content message based on the associated category. For example, ordinary conversation usually involves dialog and responses with various emotions. In the present invention, the user is provided a visual identification of the content response message as well as the identifier associated with the response. As shown in FIG. 3A, each content response 140-148 contains a visually distinguishing pattern, mark, color, or other visually identifiable feature to allow the user to quickly observe the identifier associated with the content message. It is noted that some of the content responses can have duplicate identifiers. In alternate variations, the system can provide content responses where each response has a unique identifier.

Typically, the identifiers are adjectives that describe the generated content response. Such adjectives can include the tone of the response and the emotion associated or conveyed by the response. Alternatively, the identifiers can comprise ranges of familiarity, degree of wordiness, technical jargon, formality, or any other description typically associated with a range of responses based on the same topic.

As an example, FIG. 3A shows the input message in 122, where someone poses a question about visiting the individual. For purposes of an example, a potential topic category related to this input message is whether the individual wants a visitor soon. The system then generates a number of content responses that are responsive or associated with this topic category. The system can generate the responses using various emotional identifiers (or other identifiers, as noted above). Alternatively, the system can generate the responses and then determine an emotional (or other) identifier. Then, the system displays these content messages 140-148 so that, apart from the text of the message, each content response with a respective identifier is visually distinguishable from a content response having a different identifier. In the illustration of FIG. 3A, each content response tile 140-148 contains a message that is conversationally associated/responsive to whether the individual wants a visitor.

FIG. 3A also illustrates the user interface 102 including a cursor 106 that allows a user to interact with the user interface to select one or more of the tiles 130-132, 140-148. For example, the cursor 106 can be controlled using an eye-tracker, a BCI signal, a mouse or other input device, etc. Alternatively, or in combination, a user that is able to physically interact with the user interface can simply select any tile. In the illustrated example, the user selects tile 141 with the cursor 106, which allows the system to recognize the user's desired choice as a selected content response 141. The selected content response message 124 can optionally be displayed on the user interface 102. In some variations, the system will then electronically communicate the selected content response using the device 100 or system. Electronically communicating can include providing the message using a generated voice, a recorded voice, transmitting data representative of the message to another device, or a combination thereof. In additional variations, the user can choose to alter the message before it is electronically communicated.

Figure 3B:
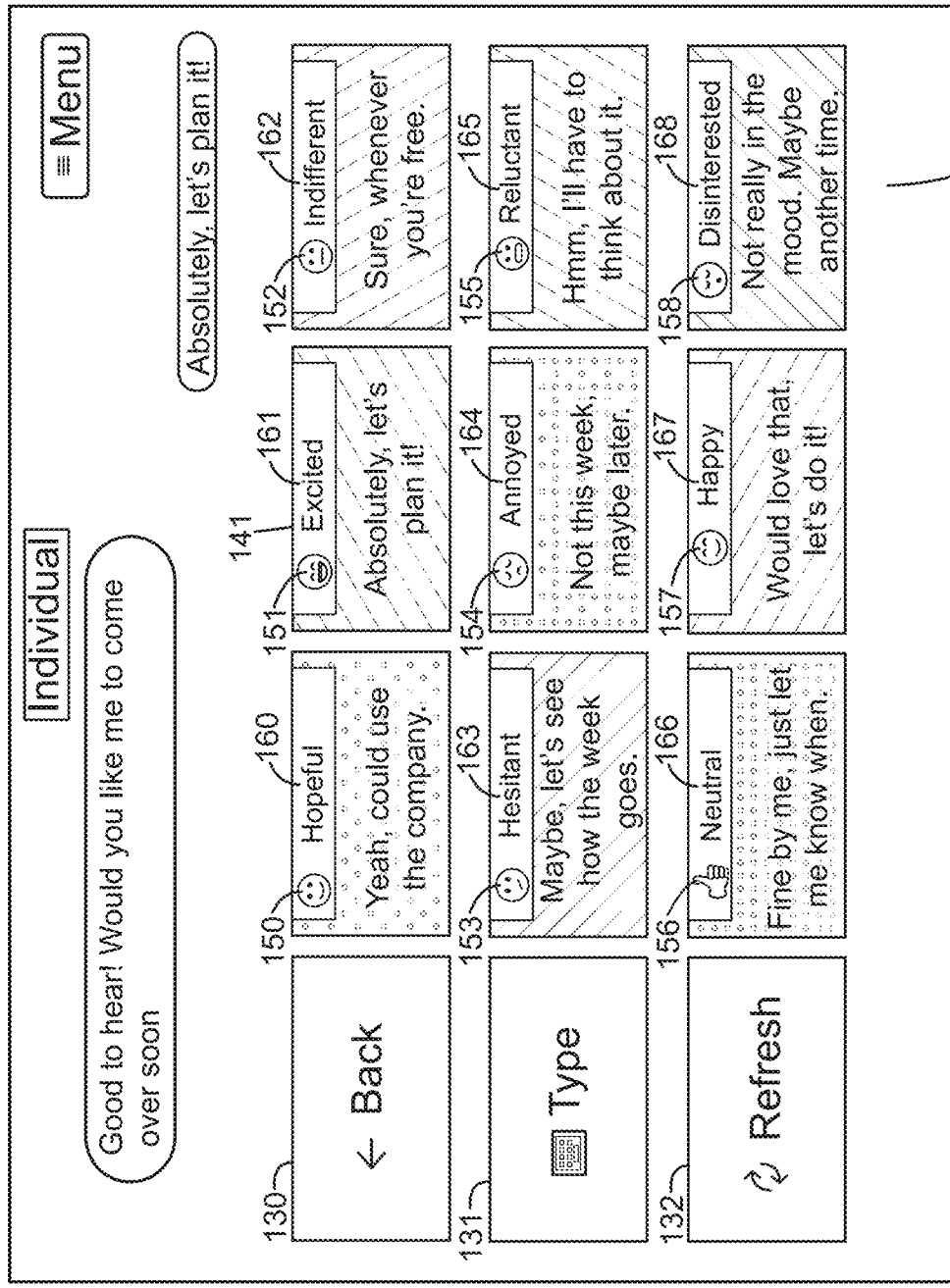
FIG. 3B illustrates a user interface similar to the one shown in FIG. 3A with additional visual icons or texts to distinguish the identifiers associated with each of the content responses.

FIG. 3B illustrates a user interface 102 similar to the one shown in FIG. 3A, but shows additional visual icons or texts to distinguish the identifiers associated with each of the content responses. In the variation shown, each tile includes a symbolic representation of the identifiers 150-158. While the figure shows a series of emoticons, any symbolic representation of the identifier can be used to provide visual distinction. The figure also shows a text descriptor of the identifier 160-168. Variations of the user interface 102 can include any combination of symbolic identifiers, text identifiers, and/or visually distinguishing patterns, marks, colors, or other visually identifiable features for the tiles. As shown, tile 141 represents a content response stating "Absolutely, let's plan it!" with an associated symbol identifier 151 and a text identifier 161 along with the cross-hatching to associate the content response with an emotional identifier of "Excited".

Figure 3C:
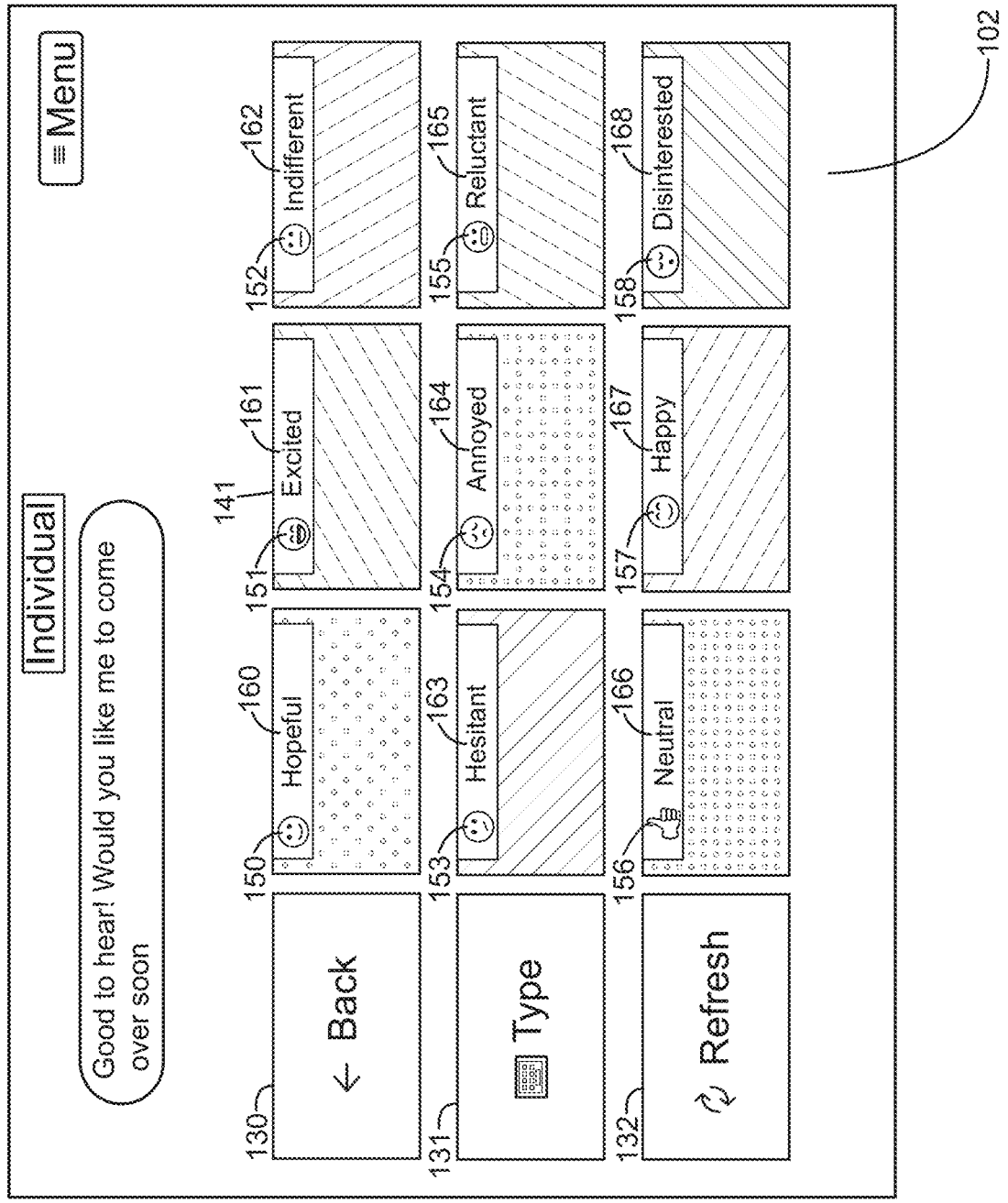
FIG. 3C shows another variation of the user interface that initially displays a plurality of identifiers without any content messages.

FIG. 3C shows another variation of the user interface 102 described above. However, in this variation, the interface generates a series of identifiers only. The identifiers can be emoticons 150-158 and/or text identifiers 160-168 without any accompanying message. For example, if the identifiers are emotional identifiers, then the interface 102 provides the user with the various emotional identifiers 150-158 and/or 160-168 before any content response is shown. This approach can mimic true conversation in response to the input prompt by allowing the individual to express an emotion in response to the input prompt 122 and then determine the text of the content response. In one variation, once the individual selects the respective tile, the content response of that tile can be electronically communicated.

Figure 3D:
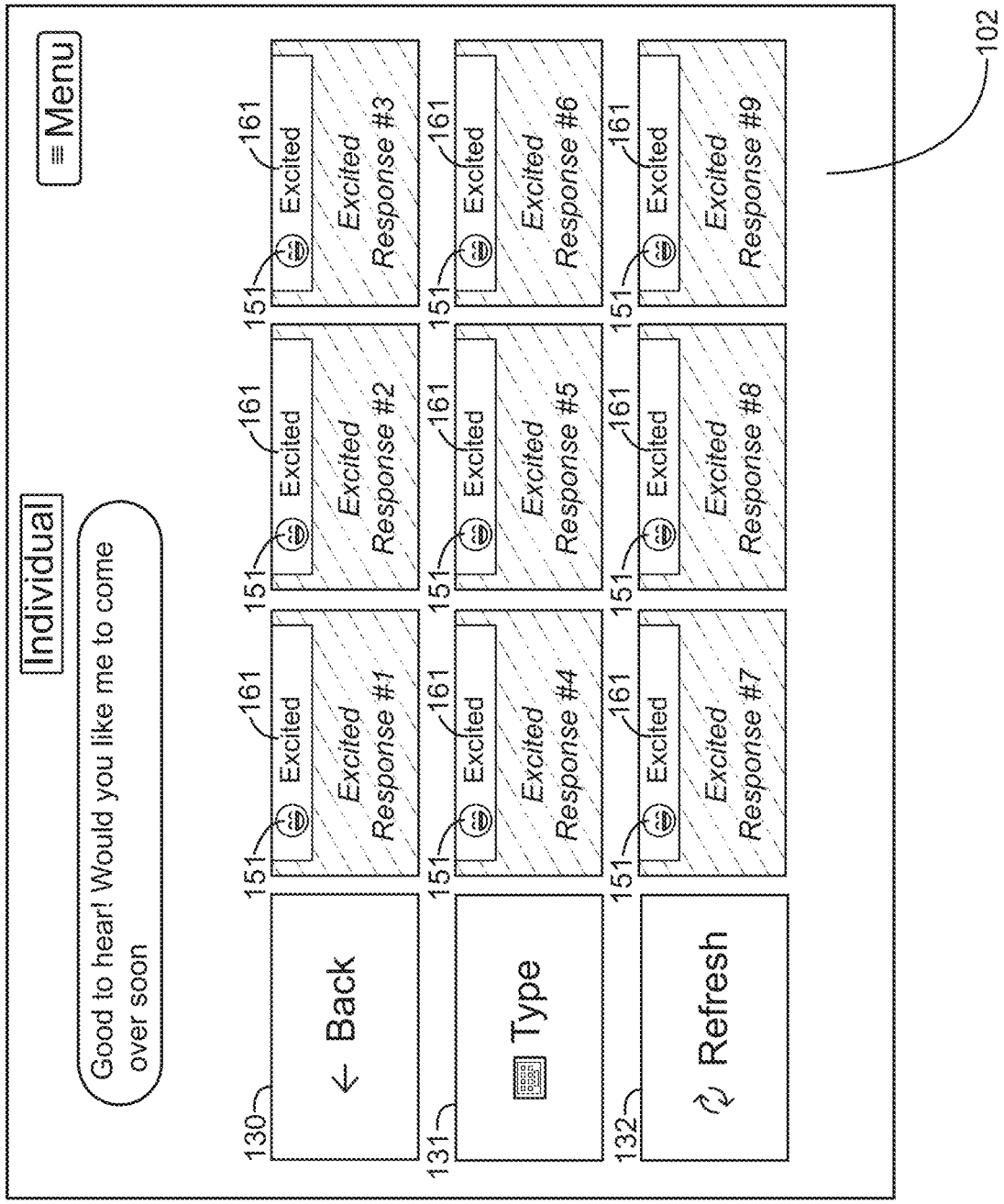
FIG. 3D shows another variation similar to FIG. 3C, where selection of an emotional identifier produces a range of content responses associated with the selected emotional identifier.

FIG. 3D shows yet another variation similar to FIG. 3C, where selection of an emotional identifier produces a range of content responses associated with the selected emotional identifier. This provides the user with a greater variety of responses associated with the selected emotional identifier. Accordingly, the user will then select a tile to electronically communicate the content response associated with that tile. The variations discussed with respect to FIGS. 3C and 3D are not limited to emotional identifiers. Instead, they can be any identifier as discussed herein.

Figure 4:
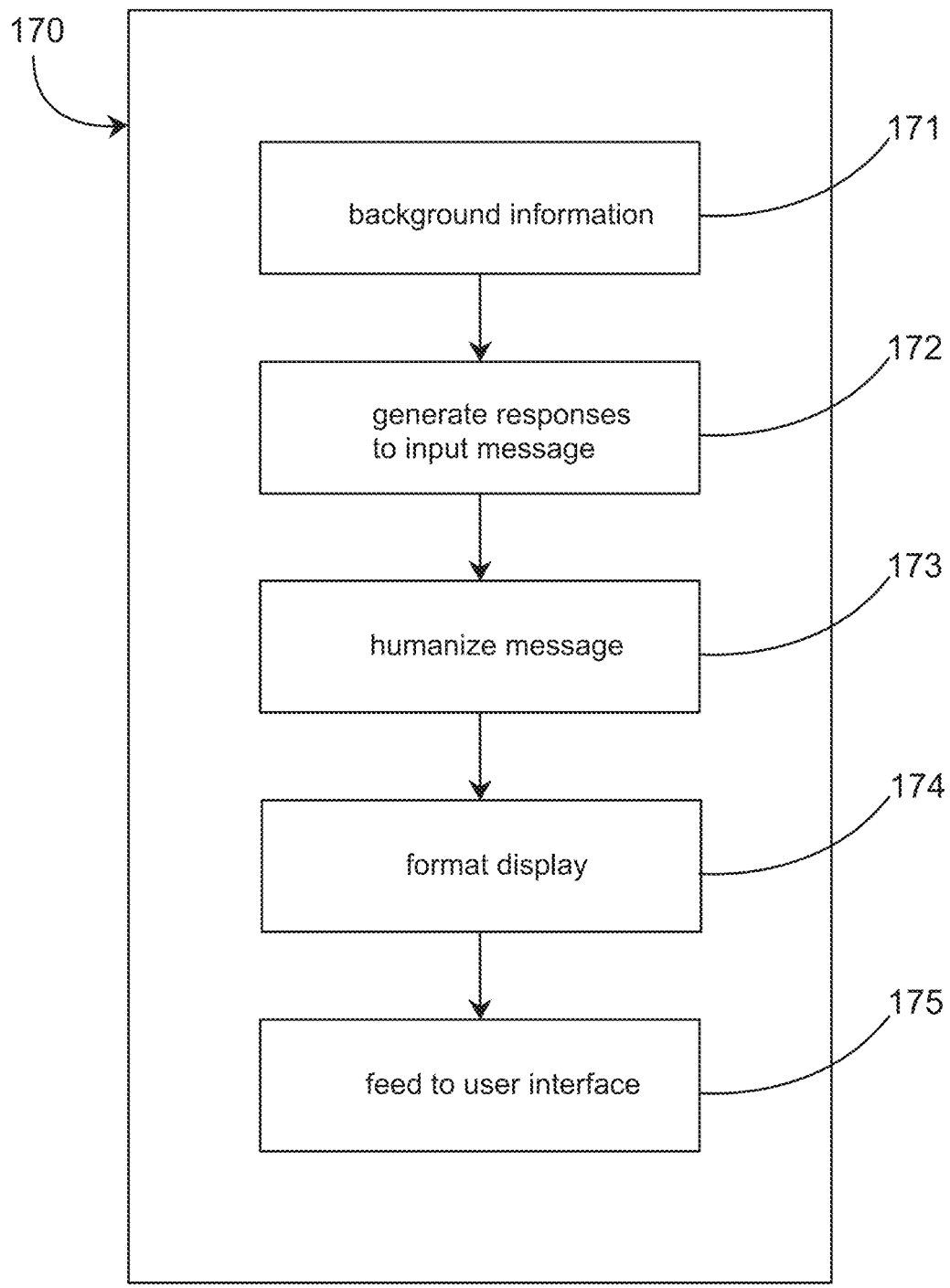
FIG. 4 illustrates a sample prompt structure fed to an LLM for generation of the user interface.

In one variation of the invention, the generation of the content responses can use a LLM model. In previous examples, Open AI's GPT4 Turbo was used to generate the information provided on the user interface. However, any LLM model can be used to populate the user interface. FIG. 4 illustrates a sample prompt structure fed to an LLM 170 for the generation of the user interface. The LLM 170 will be instructed with one or more facts related and/or unique to the user. As noted above, this assists the output of the LLM to provide content responses that would be natural to the user to ensure more personalized communication. In one example, the background 171 is provided as: "You are acting as a middle-aged man named John. You have early-stage ALS, you can talk, you live in New York with your wife and dog. You love golf and are passionate about politics." Next, the LLM generates responses to the input message based on instructions that achieve a desired tone and format. It is noted that the LLM can also be used to generate the visual distinguishing feature of the tile (e.g., colors, shading, icons, etc.)

The act of generating responses to the input message 172 can comprise generating X9 possible responses to the input message using a mix of most likely, affirmative, positive, neutral, hopeful, frustrating, and negating responses. This asks the LLM to give the users a choice by providing a list of adjectives that describe the tone of the responses to ensure a variety of responses.

Next, the LLM can be instructed to humanize the message 173 by revising each response to ensure tone is conversational, 100% spartan; use no corporate jargon; ensure the responses mimic natural human dialogue and speech; ensure heterogenous sentence lengths; use no more than 10 words in each response. Finally shorten each response. This part of the prompt is a series of steps to make the responses more realistic to what the user would say.

Once the content responses are generated 172 and humanized 173, the information is formatted for display 174. For example, as one example, the LLM can be instructed to select a hex color value for each response and ensure the color is one of #3146F5, #7437F9, #DE1C66, #00777E, #C94921, #438550, #C32CC0. The format display 174 can also assign an emoticon and/or a text description based on the LLM guessing an emotional state of the generated content response.

Next, the generated content responses and associated information are fed to a user interface, which can selectively display selected responses from the LLM.

Figure 5A:
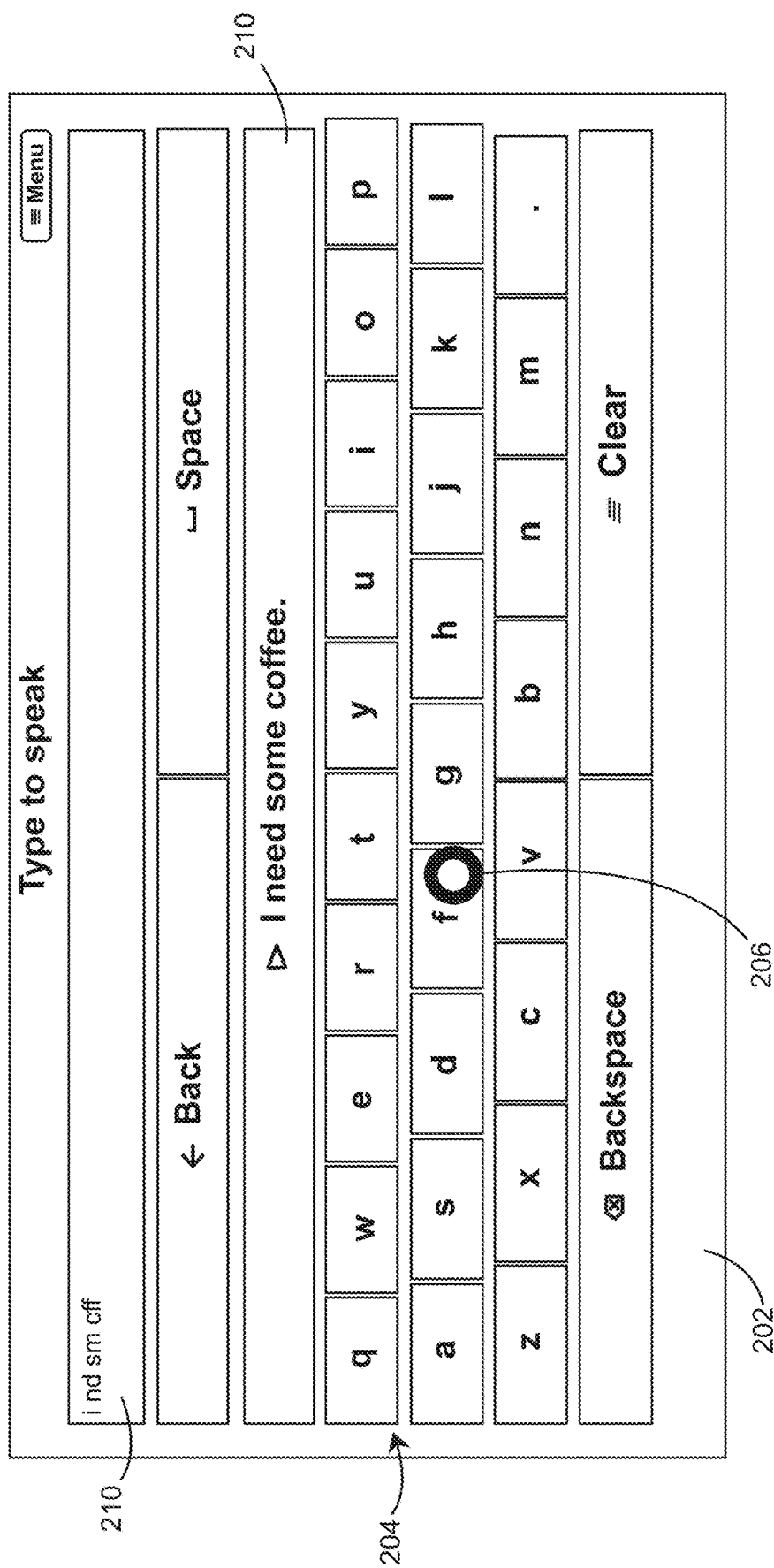
FIG. 5A shows another example of methods and systems for assisting an individual in engaging in electronic-assisted communication using minimal character input.

FIG. 5A shows another example of methods and systems for assisting an individual in engaging in electronic-assisted communication. As shown, the user interface 202 includes a QWERTY keyboard 204. The keyboard 204 can be a full electronic keyboard or, as shown, can be a lean keyboard with a minimized number of keys. As noted above, the user interface 202 can include a cursor 206 driven by a BCI or eye-tracking device to select keys to generate a message. Alternatively, the user can directly engage the user interface 202 to type a message. The user types a message input into the input prompt 210. The system allows the user to make their best attempt to type out their intended message in the input prompt 210. Next, an LLM can then be prompted to take the string of characters in the input prompt and guess what the user was trying to say based on a multitude of personal information data factors related to the user. Such personal information data can include the writing style of the user, proper nouns the user may use, calendar information, demographic information, personal profile, likes and dislikes, health status, calendar, and, in the context of a patient, a schedule of their latest medical appointment, treatment schedule, and current primary hospital information.

One benefit of this approach is that the user has the option to skip vowels and punctuation, keep everything in lowercase, and rarely use backspace. Since this would replace a row of traditional auto-correct words, it would also save the user from having to click on an additional button as they are typing and increase the speed of communication. This would reduce the number of keys needed on the keyboard (such as exclamation point, caps lock, etc.), which in turn would speed up the time needed to type their message.

The user interface would then provide an output 210 to electronically display at least one content phrase separately from the input prompt. This separation allows the user to concentrate on the input message in the input prompt 210 without having to accept suggested or predictive words, as is common with traditional predictive typing models. Next, the user interface is configured to permit the individual to select at least one content phrase as a selected content response phrase and can then electronically communicate the selected content response phrase using the electronic assistance device, as discussed above.

Figure 5B:
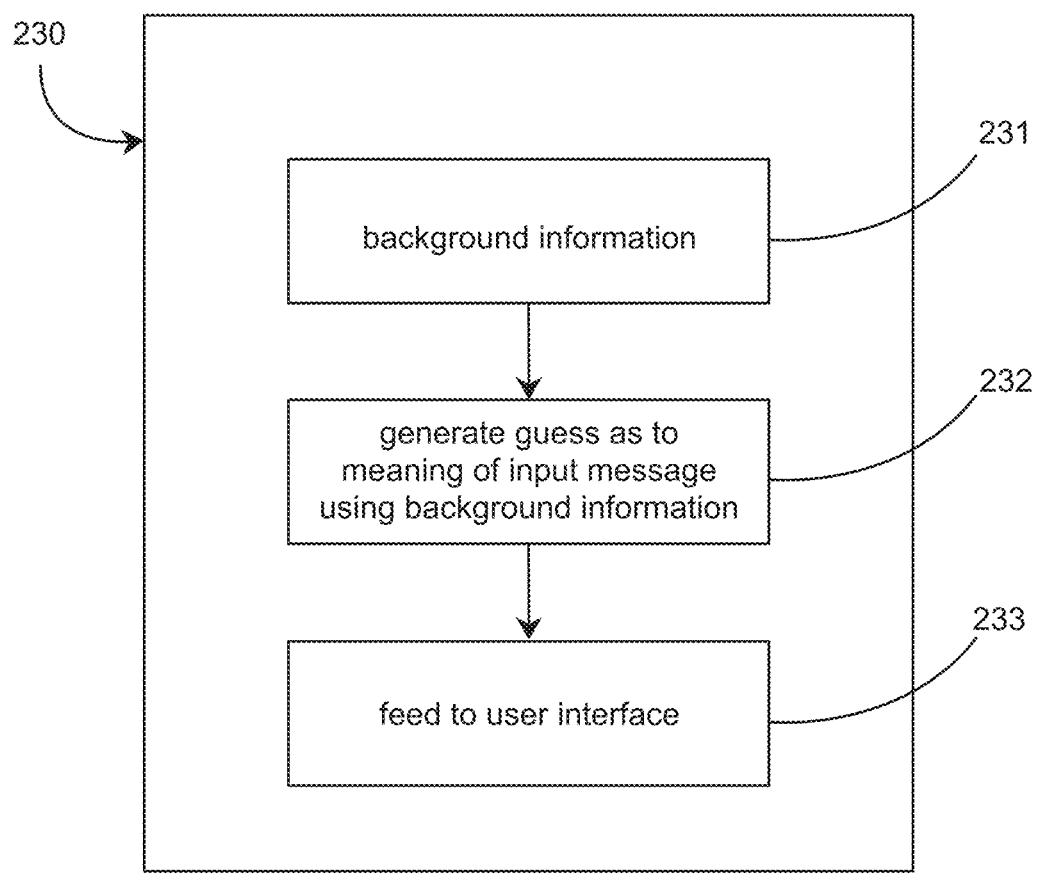
FIG. 5B illustrates a sample prompt structure fed to an LLM for generation of the user interface.

FIG. 5B illustrates a sample prompt structure fed to an LLM 170 for the generation of the user interface. As shown, the LLM uses background information 231 about the individual to generate a guess 232 as to the meaning of the input message. The resulting guess is fed 233 to the user interface. In one example, a prompt provided to the LLM included: "Acting as a copywriter, correct the grammar and capitalization in a phrase typed out by a person with a disability using an AAC device. If it is already a correct and full sentence, just repeat the phrase I gave you with no additional text, but if it is not a correct English sentence, make your best guess as to what the person is trying to say and add words to ensure it is a full grammatically correct sentence. If you are unable to make a guess, just repeat the phrase I gave you. Do not add any additional text. The phrase is the input phrase."

Figure 6:
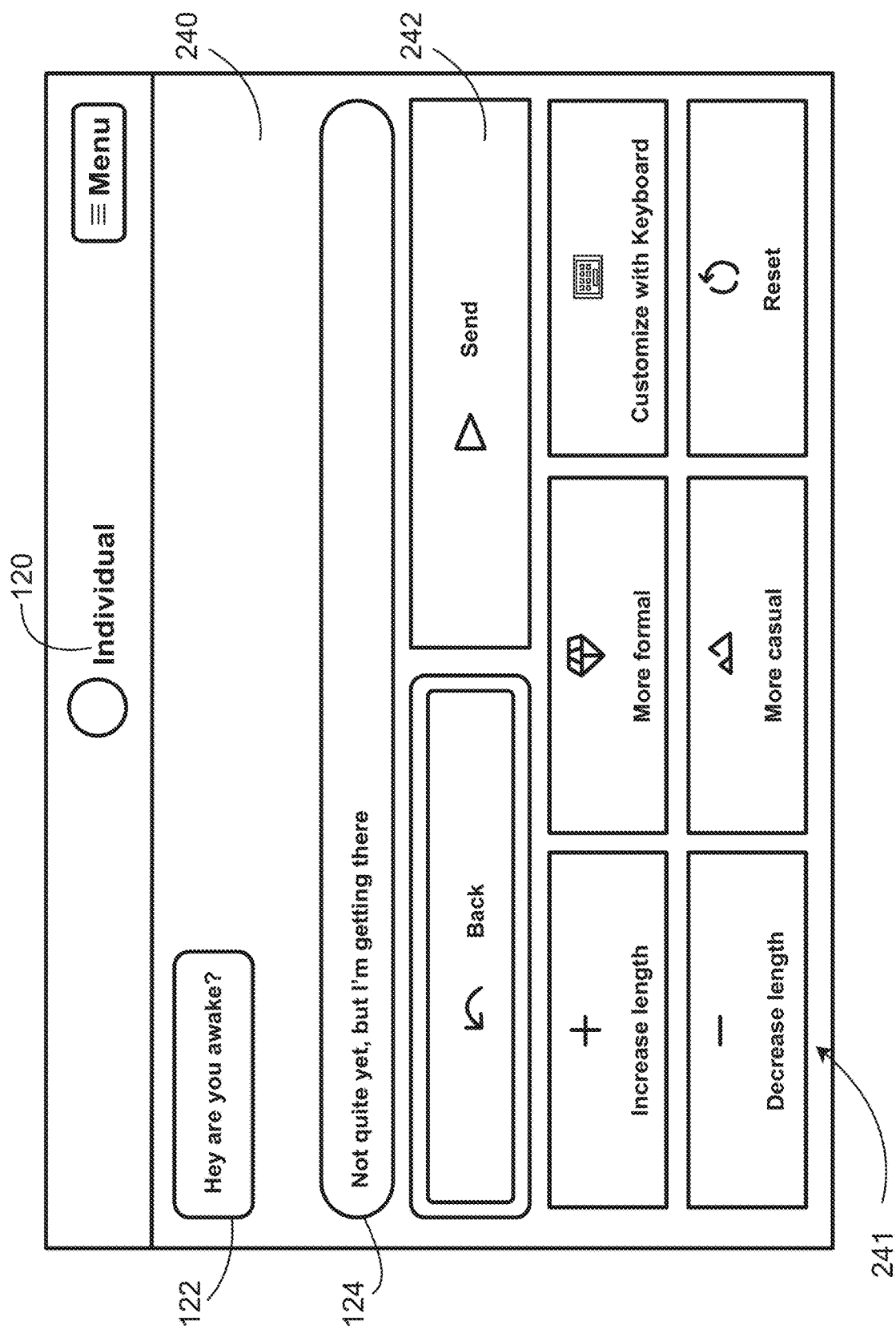
FIG. 6 illustrates a user interface that allows an individual to customize a content response that has been selected.

FIG. 6 illustrates a screen on the user interface 240 that allows an individual 120 to customize a content response 124 that has been selected. This gives the user the option to make the message 124 match their speaking or writing style towards the recipient using various parameters 241. In this example, increase or decrease its length, make it more formal or casual, and they can edit the message and type instead. This customization can be used with any of the generative content responses discussed herein.

Figure 7A:
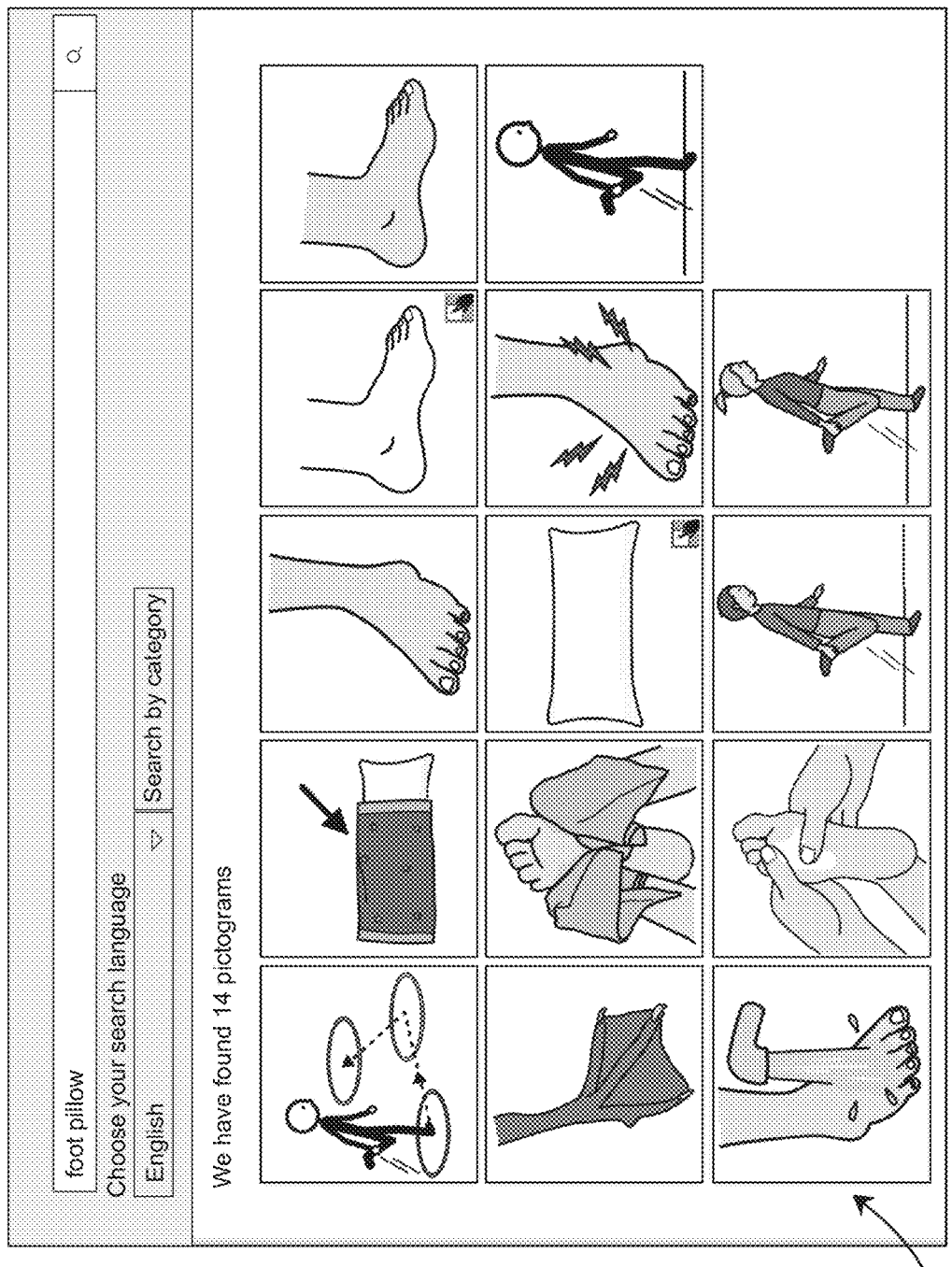
FIG. 7A shows an example from the ARASAAC site when the term "foot pillow" is entered in a search field.

Another example of generative content relates to the use of pictograms for use with Augmentative and Alternative Systems of Communication (AAC) software and interfaces. Typically, pictograms in AAC-based interfaces are sourced from large libraries of graphical art such as ARASAAC (https://arasaac.org/aac/en). The number of symbols in these collections can often exceed 10000 images. But, while they are considered comprehensive, they do not cover every single possible need. For example, FIG. 7A shows an example from the ARASAAC site when the term "foot pillow" is entered in a search field. The resulting suggested various pictograms show various foot symbols and a pillow symbols separately but not within the same image.

Figure 7B:
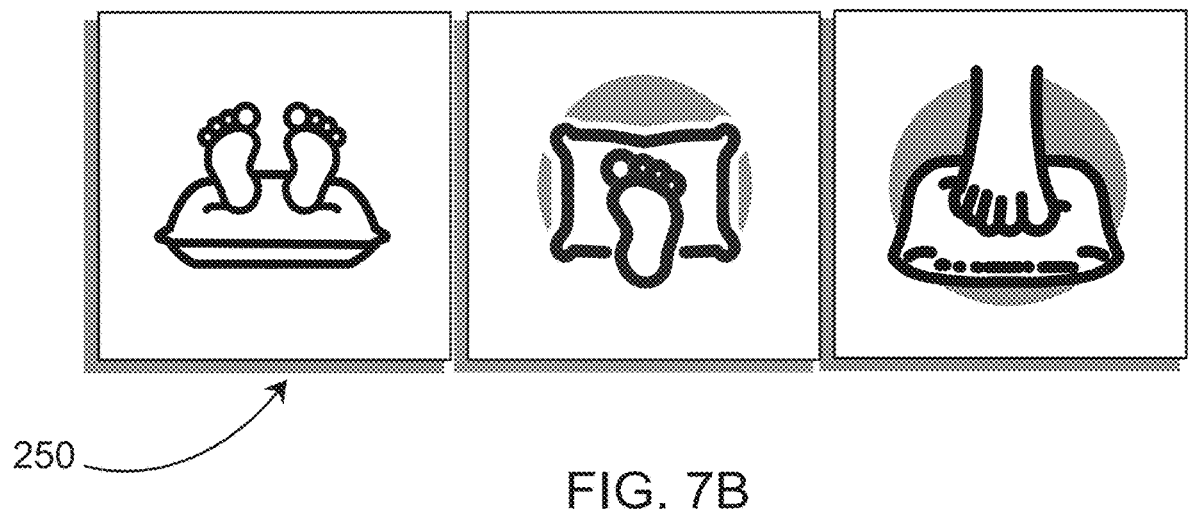
FIGS. 7B and 7C show a number of AI-generated pictograms that can be used with an AAC interface.

Another problem with current AAC interfaces is that they require a proper setup to effectively assist the individual using the system. Typically, the caregiver setting up the system must spend a significant amount of time matching images to items/commands. In many cases, manually selected pictograms are not a good representation of the item being represented. This can often prevent the AAC interface from being a viable communication assistant for the user. The generative content systems address these issues by using an AI image generator (e.g., DALL-E) in the user interface to create a custom pictogram image that more accurately represents the item at hand. For example, FIG. 7B shows a series of AI generated foot pillows 250 created by the system. An example of the template prompt is provided below between the brackets, where the phrase between the quotes is the word or phrase displayed on the tile.

Prompt: {In the style of a pictogram used in AAC software, create a color icon "symbol". Ensure the background is white. Just return the symbol and do not add any additional outlines.}

Figure 7C:
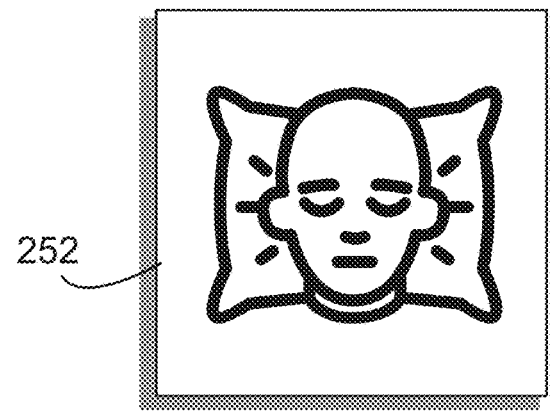

To ensure that the icons created are consistent with each other, the image generator can be instructed to conform to the style of a reference image. As shown in FIG. 7C, the generated pictogram 252 comprises a "head pillow" symbol using the previously generated "foot pillow" symbol as a reference.

As noted herein, the LLM used for variations of the systems and methods described herein is configured to incorporate each user's needs and circumstances. In one aspect of the LLM uses demographic information, personal profile, likes and dislikes, health status, calendar, and, in the context of a user, these may be a schedule of their latest medical appointment, treatment schedule, and current primary hospital. This personal information would be integrated into the LLM by priming via prompting and/or plug-ins to create multiple streams of personal context to groom the LLM in real-time asynchronously as information arises and take into consideration its text generation in response to a live input.

Figure 8A:
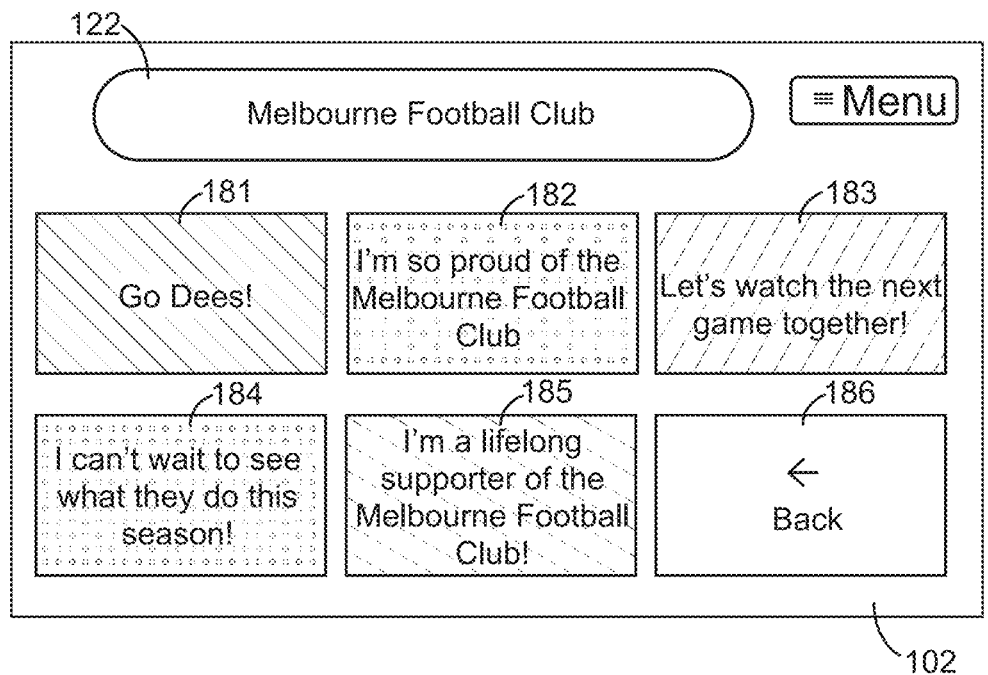
FIGS. 8A and 8B show variations of user interfaces that show a number of content responses generated in response to an input command.
Figure 8B:
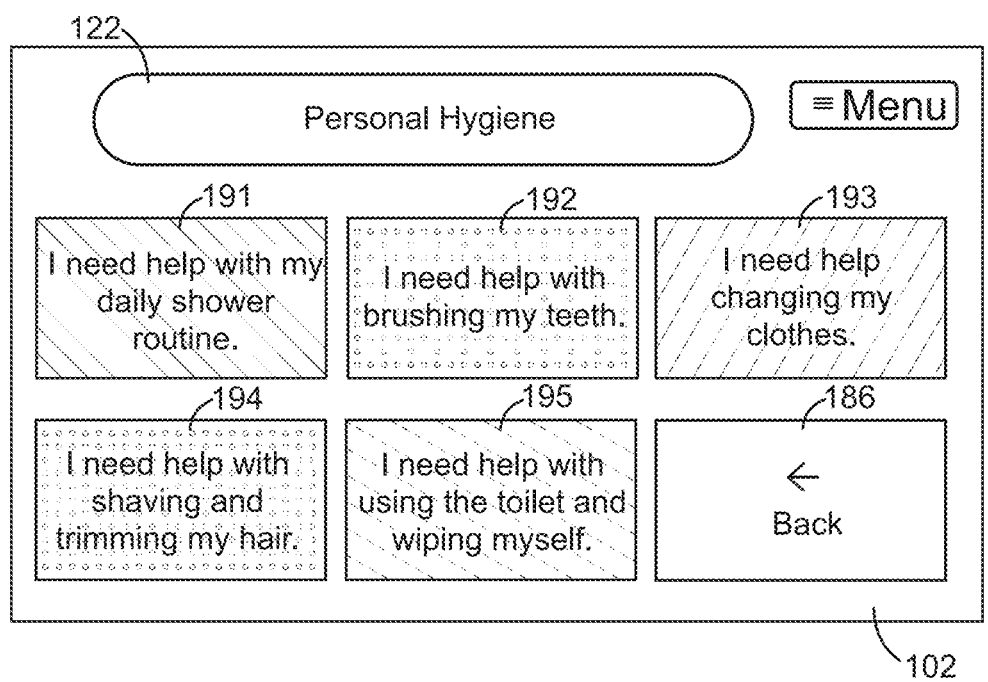

The incorporation/integration of the user's personal information with an LLM can create content generation that is more relevant to the user when communicating. For example, the user can select a word or set of words as an input command for the elements of the sentence they wish to create (subject, object, etc.). These words can be suggested by the LLM, given the context of the current sentence and entire chat history, or manually entered by the user. For example, in FIGS. 8A and 8B, the input commands shown in the user interface 102 of FIGS. 8A and 8B are, respectively "Melbourne Football Club" and "Personal Hygiene".

Next, the LLM generates possible generative content responses 181-185 and 191-195 from the input commands 122. The user interface 102 is configured to allow the user the option to select one of the possible generative content responses 181-185 and 191-195 generated from the personal information of the user. These basic examples allow the user to have a range of content responses 181-185 and 191-195 tailored to that particular user. As shown, each response can be visually distinct to allow the user to rapidly select a desired content response for electronic communication. As shown, the user interface 102 can include any number of operational tiles 186 for navigation through the user interface.

As for other details of the present invention, materials and manufacturing techniques may be employed as within the level of those with skill in the relevant art. The same may hold true with respect to method-based aspects of the invention in terms of additional acts that are commonly or logically employed. In addition, though the invention has been described in reference to several examples, optionally incorporating various features, the invention is not to be limited to that which is described or indicated as contemplated with respect to each variation of the invention.

Various changes may be made to the invention described and equivalents (whether recited herein or not included for the sake of some brevity) may be substituted without departing from the true spirit and scope of the invention. Also, any optional feature of the inventive variations may be set forth and claimed independently, or in combination with any one or more of the features described herein. Accordingly, the invention contemplates combinations of various aspects of the embodiments or combinations of the embodiments themselves, where possible. Reference to a singular item, includes the possibility that there are plural of the same items present. More specifically, as used herein and in the appended claims, the singular forms "a," "and," "said," and "the" include plural references unless the context clearly dictates otherwise.

It is important to note that where possible, aspects of the various described embodiments, or the embodiments themselves can be combined. Where such combinations are intended to be within the scope of this disclosure.

We claim:

1. A method for assisting an individual in engaging in electronic-assisted communication, the method comprising:
   obtaining an input prompt using an electronic assistance device;
   assessing the input prompt to identify a topic category associated with the input prompt using a computer processor;
   generating a plurality of content responses using the topic category such that the plurality of content responses are conversationally associated with the topic category, wherein each content response from the plurality of content responses is further associated with an emotion identifier selected from a plurality of emotion identifiers, and wherein generating the plurality of content responses comprises using a large language model operatively networked to the electronic assistance device;
   electronically displaying the plurality of content responses in a display of a user interface, where a first emotion identifier associated with a first content response is visually distinguishable on the display from a second emotion identifier associated with a second content response;
wherein the user interface is configured to permit the individual to select at least one of the plurality of content responses as a selected content response; and
electronically communicating the selected content response using the electronic assistance device.

2. The method of claim 1, wherein the electronic assistance device comprises a brain-computer interface.

3. The method of claim 1, wherein the electronic assistance device comprises a portable digital device.

4. The method of claim 1, wherein the electronic assistance device comprises a computer system.

5. The method of claim 1, further comprising accessing a database containing a plurality of informational data specific to the individual, where generating the plurality of content responses comprises generating at least one content response containing at least one informational data specific to the individual.

6. The method of claim 5, wherein the plurality of informational data specific to the individual includes data selected from the group consisting of: demographic information, personal preferences, biographic information, family information, health information, calendar information, medical treatment information, historical information.

7. The method of claim 1, where obtaining the input prompt occurs actively by entering a recording into the electronic assistance device.

8. The method of claim 1, where obtaining the input prompt occurs passively.

9. The method of claim 1, wherein electronically communicating the selected content response using the electronic assistance device comprises displaying the selected content response electronically.

10. The method of claim 1, wherein electronically communicating the selected content response using the electronic assistance device comprises generating an audible voice that recites the selected content response.

11. The method of claim 1, wherein before electronically communicating the selected content response, providing the individual with an ability to customize the selected content response using the user interface.

12. A method for assisting an individual in engaging in electronic-assisted communication, the method comprising:
obtaining an input prompt using an electronic assistance device;
generating a plurality of emotion identifiers using the input prompt;
electronically displaying the plurality of emotion identifiers in a display of a user interface, wherein the user interface is configured to permit the individual to select at least one of the plurality of emotion identifiers as a selected emotion identifier;
electronically displaying a plurality of content responses associated with the selected emotion identifier on the user interface, wherein the plurality of content responses are generated using a large language model operatively networked to the electronic assistance device, and wherein the user interface is configured to permit the individual to select at least one of the plurality of content responses as a selected content response; and
electronically communicating the selected content response using the electronic assistance device.

13. The method of claim 12, further comprising assessing the input prompt to identify a topic category associated with the input prompt using a computer processor such that the plurality of content responses are conversationally associated with the topic category, where each content response from the plurality of content responses is further associated with the selected emotion identifier.

14. The method of claim 12, wherein electronically displaying the plurality of emotion identifiers in the display of the user interface such that each of the plurality of emotion identifiers are visually distinguishable from a remainder of the plurality of emotion identifiers.

15. An electronic system for assisting an individual in engaging in electronic-assisted communication, the electronic system comprising:
a memory unit;
a recording device configured to convey an input prompt to the memory unit;
a processor configured access the memory unit to assess the input prompt and identify a topic category associated with the input prompt and generate a plurality of content responses using the topic category such that the plurality of content responses are conversationally associated with the topic category, wherein each content response from the plurality of content responses is further associated with an emotion identifier selected from a plurality of emotion identifiers, and wherein the processor is operatively networked to a large language model for generating the plurality of content responses;
a user interface having an electronic display configured to display the plurality of content responses, where the processor is further configured to provide to the electronic display a first emotion identifier associated with a first content response that is visually distinguishable on the electronic display from a second emotion identifier associated with a second content response;
the user interface further configured to permit the individual to select at least one of the plurality of content responses as a selected content response; and
where the processor is further configured to electronically communicate the selected content response.

16. The electronic system of claim 15, wherein the processor is operatively networked to a database containing a plurality of informational data specific to the individual, where generating the plurality of content responses comprises generating at least one content response containing at least one informational data specific to the individual.

17. The electronic system of claim 15, where the recording device is configured to actively have a recording state for actively recording the input prompt.

18. The electronic system of claim 15, where the recording device is configured to actively a recording state that passively records the input prompt.

19. The electronic system of claim 15, the processor is configured to electronically communicate the selected content response by causing the selected content response to be transmitted to an external display device.

20. The electronic system of claim 15, the processor is configured to electronically communicate the selected content response by displaying the selected content response on the electronic display.

21. The electronic system of claim 15, further comprising a speaker such that the processor causes generation of an audible voice of the selected content response.

* * * * *